(12) United States Patent
Wang et al.

(10) Patent No.: US 12,531,263 B2
(45) Date of Patent: Jan. 20, 2026

(54) CELL BATTERY

(71) Applicant: Renata AG, Itingen (CH)

(72) Inventors: Xiaojun Wang, Zunzgen (CH); Remo Frey, Titterten (CH); Pascal Haering, Muttenz (CH)

(73) Assignee: Renata AG, Itingen (CH)

( * ) Notice: Subject to any disclaimer, the term of this patent is extended or adjusted under 35 U.S.C. 154(b) by 935 days.

(21) Appl. No.: 17/615,371

(22) PCT Filed: Apr. 17, 2020

(86) PCT No.: PCT/EP2020/060906
§ 371 (c)(1),
(2) Date: Nov. 30, 2021

(87) PCT Pub. No.: WO2020/244837
PCT Pub. Date: Dec. 10, 2020

(65) Prior Publication Data
US 2022/0231320 A1    Jul. 21, 2022

(30) Foreign Application Priority Data
Jun. 4, 2019 (EP) .................................. 19178220

(51) Int. Cl.
*H01M 10/04* (2006.01)
*H01M 10/0585* (2010.01)
(Continued)

(52) U.S. Cl.
CPC ... *H01M 10/0427* (2013.01); *H01M 10/0585* (2013.01); *H01M 50/109* (2021.01);
(Continued)

(58) Field of Classification Search
CPC ............. H01M 10/0427; H01M 50/50; H01M 50/536; H01M 50/109; H01M 10/0585
See application file for complete search history.

(56) References Cited

U.S. PATENT DOCUMENTS

2014/0255763 A1* 9/2014 Aryanfar ........... H01M 10/4285
429/174
2015/0288026 A1* 10/2015 Yamamoto ........ H01M 10/0585
429/179
(Continued)

FOREIGN PATENT DOCUMENTS

CN    103688389 A    3/2014
CN    106505236 A    3/2017
(Continued)

OTHER PUBLICATIONS

English Machine Translation of Jp 2005310577A (Year: 2005).*
(Continued)

*Primary Examiner* — Kourtney R S Carlson
(74) *Attorney, Agent, or Firm* — Oblon, McClelland, Maier & Neustadt, L.L.P.

(57) ABSTRACT

A cell includes a case designed to form a housing, an assembly of stacked electrodes placed inside the housing and including one or more units each having a positive electrode, a negative electrode, a separator between the positive and negative electrodes and an electrolyte. The assembly is held together, and at least each negative electrode of the one or more units includes one or more notches, vertically aligned along the height of the assembly so to design a substantially flat contact surface.

15 Claims, 5 Drawing Sheets

(51) Int. Cl.
  H01M 50/109 (2021.01)
  H01M 50/50 (2021.01)
  H01M 50/536 (2021.01)
  H01M 50/54 (2021.01)

(52) U.S. Cl.
  CPC ......... H01M 50/50 (2021.01); H01M 50/536 (2021.01); H01M 50/54 (2021.01); *H01M 2220/30* (2013.01)

(56) References Cited

U.S. PATENT DOCUMENTS

| | | | |
|---|---|---|---|
| 2016/0149256 A1* | 5/2016 | Leroux | H01M 50/514 429/153 |
| 2017/0069880 A1 | 3/2017 | Wang et al. | |
| 2018/0287210 A1* | 10/2018 | Matsuura | H01M 10/0585 |
| 2019/0334210 A1 | 10/2019 | Matsuzaki et al. | |

FOREIGN PATENT DOCUMENTS

| | | | | |
|---|---|---|---|---|
| CN | 108140867 A | | 6/2018 | |
| EP | 3 139 434 A1 | | 3/2017 | |
| JP | 2005310577 A | * | 11/2005 | |
| JP | 2008091099 A | * | 4/2008 | |
| JP | 2011-81941 A | | 4/2011 | |
| JP | 2011-141997 A | | 7/2011 | |
| JP | 2015-533013 A | | 11/2015 | |
| JP | 2016-110856 A | | 6/2016 | |
| JP | 2017-134901 A | | 8/2017 | |
| WO | WO-2011134818 A1 | * | 11/2011 | ......... H01M 10/482 |
| WO | WO 2018/155211 A1 | | 8/2018 | |

OTHER PUBLICATIONS

International Search Report mailed on Jul. 8, 2020 in PCT/EP2020/060906 filed on Apr. 17, 2020, (3 pages).

Combined Chinese Office Action and Search Report issued Feb. 16, 2023, in corresponding Chinese Patent Application. No. 202080040651.7 (with English Translation and English Translation of Category of Cited Documents), 14 pages.

Japanese Office Action issued Jun. 27, 2023 in Japanese Application 2021-567007 (submitting English translation only), 4 pages.

Japanese Office Action issued Dec. 20, 2022 in Japanese Patent Application No. 2021-567007 (with English Translation), 13 pages.

* cited by examiner

CELL BATTERY

FIELD OF THE INVENTION

The present invention relates to power supplier systems and, more particularly to batteries which can be used as power supplier, inter alia, for wear electronic devices. The present invention specifically relates to a cell comprising a case designed to form a housing, an assembly of stacked electrodes placed inside the housing and comprising one or more units each comprising a positive electrode, a negative electrode, a separator between the positive and negative electrodes, an electrolyte and holding means for holding the assembly together.

BACKGROUND OF THE INVENTION

Recent developments on portable and wearable electronic devices are requiring minimized power supplier systems, namely cells which can provide high volumetric energy and power density. The electrode stack is a suitable design that can effectively fulfill the requirements for such type of application. A stacked cell including a stack of positive and negative electrodes is known in the art. A separator is provided between the positive and negative electrodes to prevent short circuit, while allowing sufficient ionic conductivity from one half cell to the other. Such a battery including an assembly of stacked electrodes is disclosed for example in U.S. Pat. No. 3,907,599 B1, in patent publication EP 2610945 A1 or in patent publication EP 3139434 A1. The assembly of stacked electrodes is connected to an external circuitry via contact tabs protruding from the positive and negative electrodes respectively.

When designing the cell with these stacked electrodes, the person skilled in the art faces the problem of how to maximize the use of the available volume to optimize the overall power density of the cell and he or she needs to consider, among other aspects, the size and shape of the electrodes, the design of the terminal tabs, the design of the means of contact between the electrodes and the terminal tabs, as well as the design of the electrode packing. All the above considerations must also take into account that the overall manufacturing process of the designed cell has to be kept as simple and as cost-effective as possible.

Traditionally, packing tapes are applied around the electrodes stack to hold the single electrodes and separators together. The design of the prior art cells, however, provides for a small contact surface area between the flaps of the packing tape and the edges of the electrodes, thus leading to poor packing tightness and stacking alignment among the electrodes. These factors reduce the quality of the cell performance and require higher precision during the assembly process. The lack of packing tightness and stacking alignment causes a waste of volume within the cell itself, thus limiting its overall energy density.

Furthermore, the large empty space left by irregularly folded flaps enables the electrode stack to move against the metal case when external forces are applied. Therefore, the movement of the electrode stack increases the risk of defects and functional failure during transportation and/or use of the cell.

There is therefore a need for an alternative cell design enabling to overcome the drawbacks mentioned above.

SUMMARY OF THE INVENTION

In a first aspect, the present invention relates to a cell comprising a case designed to form a housing, an assembly of stacked electrodes placed inside the housing and comprising one or more units each comprising a positive electrode, a negative electrode, a separator between the positive and negative electrodes, an electrolyte and holding means for holding the assembly together. According to the invention, at least each negative electrode of the one or more units comprises one or more notches, vertically aligned along the height of the assembly so to design a substantially flat contact surface for the holding means.

In one embodiment of the present invention, the case is made of metal and comprises a positive side, a negative side and a gasket.

In another embodiment of the present invention, the holding means are in form of adhesive tape, adhesive glues, clamps or combinations thereof.

In still another embodiment of the present invention, the holding means comprises rubber-based material, acrylic-based material, silicone-based material or combinations thereof.

In still another embodiment of the present invention, the cell comprises a packing tape comprising a basis placed between the assembly and the case.

In yet another embodiment of the present invention, the holding means comprises at least one packing flap which is integral with the basis. In an embodiment, the basis and the packing flap independently comprise a substrate made of polyesters, polyolefins, polyimides, fluoropolymers, vinyl polymers, styrol polymers, glass fiber based substrates, cellulose based material, derivatives thereof or combinations thereof.

In another embodiment of the present invention, the at least one packing flap comprises an adhesive layer facing the assembly.

In another embodiment of the present invention, the packing tape is an insulating packing tape to avoid electrical contact between the assembly and the case.

In still another embodiment of the present invention, each negative electrode has a larger surface than each positive electrode of the one or more units and only each negative electrode of the one or more units comprises the at least one notch.

In another embodiment of the present invention, each positive electrode comprises a cathode tab and each negative electrode comprises an anode tab, the cathode tabs being welded together to form a positive welding joint and the anode tabs being welded together to form a negative welding joint, the positive welding joint being folded substantially vertically towards the positive side of the case and the negative welding joint being folded substantially vertically towards the negative side of the case.

In still another embodiment of the present invention, the basis and the packing flap are a single piece.

In yet still another embodiment of the present invention, the packing tape comprises at least two packing flaps extending, preferably symmetrically, from either side of the insulator basis.

In yet still another embodiment of the present invention, the cell further comprises a contact tab placed between the packing tape and the positive metal case which is adjacent to said insulating packing tape, said contact tab being arranged to lead contact between the positive electrode of the one or more units and the positive side.

In a further embodiment of the present invention, the cell is a coin cell.

In a further aspect, the present invention relates to an assembly of stacked electrodes comprising one or more units each comprising a positive electrode, a negative electrode and a separator between the positive and the negative electrodes; holding means for holding the assembly together, characterized in that at least each negative electrode of the one or more units comprises one or more notches, vertically aligned along the height of the assembly so to design a substantially flat contact surface for the holding means.

In a further aspect, the present invention relates to a method for producing a cell as defined above, comprising the steps of:
  a) stacking together alternatively a positive electrode and a negative electrode by placing a separator in-between them to form an assembly of stacked electrodes;
  b) applying holding means to the assembly of stacked electrodes to maintain the stacked electrodes permanently tight and aligned to each other;
  c) filling the assembly of stacked electrodes obtained under b) with an electrolyte;
  d) placing the assembly of stacked electrodes obtained under c) into the case;
  e) assembling the cases.

Alternatively, steps c) and d) may be inverted in the method described above, that is the assembly of stacked electrodes is first placed into the case and then filled with an electrolyte.

The cell according to the present invention shows increased tightness and alignment of the electrode stack and provides better and more sustainable performance. Due to the presence of at least one notch, the contact surface between the electrodes and the holding means substantially increases and becomes a large flat area. This enables a perfect fit of the holding means and the electrode stack.

Furthermore, the cell according to the present invention enables an increased overall tightness of the electrode stack against the case of the cell and, accordingly, it ensures a more reliable performance when external forces are applied.

The cell according to the present invention enables to improve the volume utilization of the active electrode material, thus substantially increasing the cell energy density.

The assembly process of the cell is also less complex since the tightly aligned electrodes of the assembly do not have freedom to move once placed into the cell case.

BRIEF DESCRIPTION OF THE DRAWINGS

The aims, advantages and features of the present invention will appear more clearly in the following detailed description of at least one embodiment of the invention, given solely by way of example, in a non-limiting manner and illustrated by the annexed drawings in which.

DETAILED DESCRIPTION OF THE INVENTION

Figure 4:
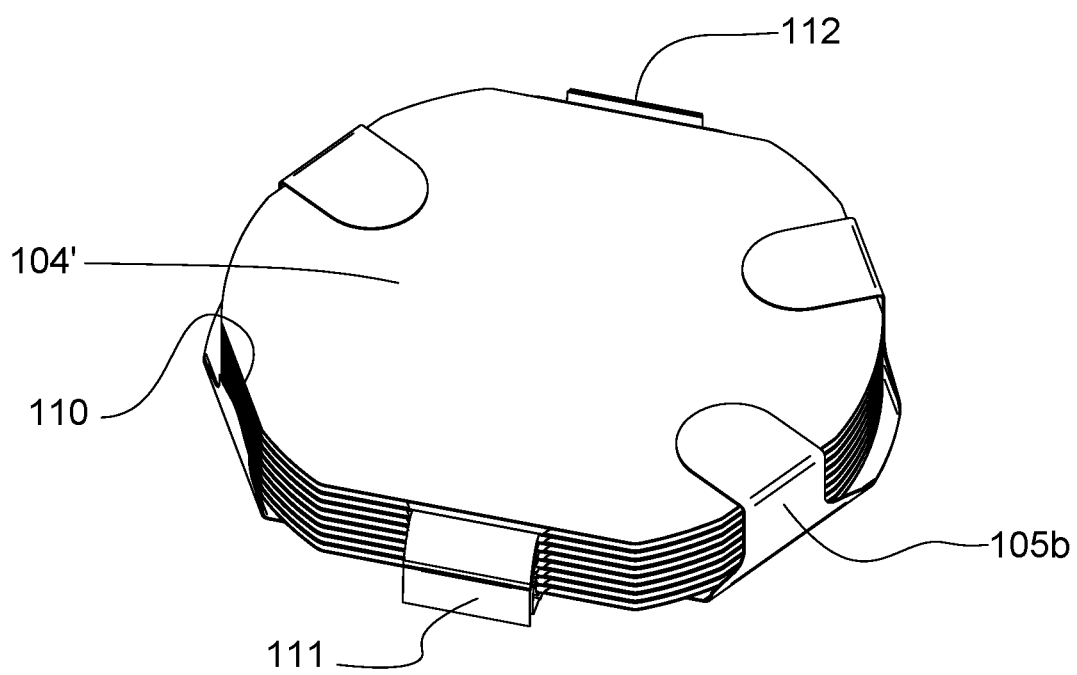
FIG. 4 is a perspective view from the positive welding joint of an assembly of stacked electrodes of the coin cell of FIG. 1.
Figure 5:
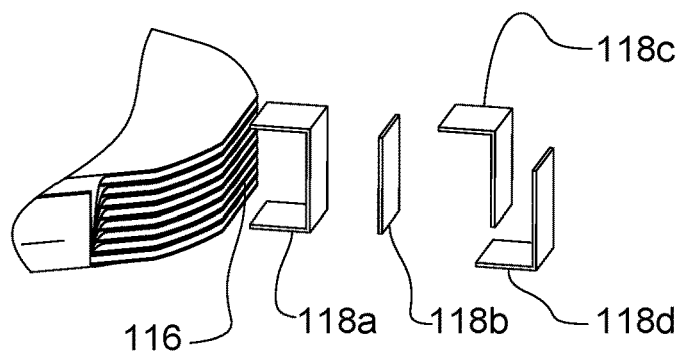
FIG. 5 is a detail of a perspective view of an assembly of stacked electrodes of the coin cell of FIG. 1 with different holding means which can be used alone or in combination.
Figure 6:
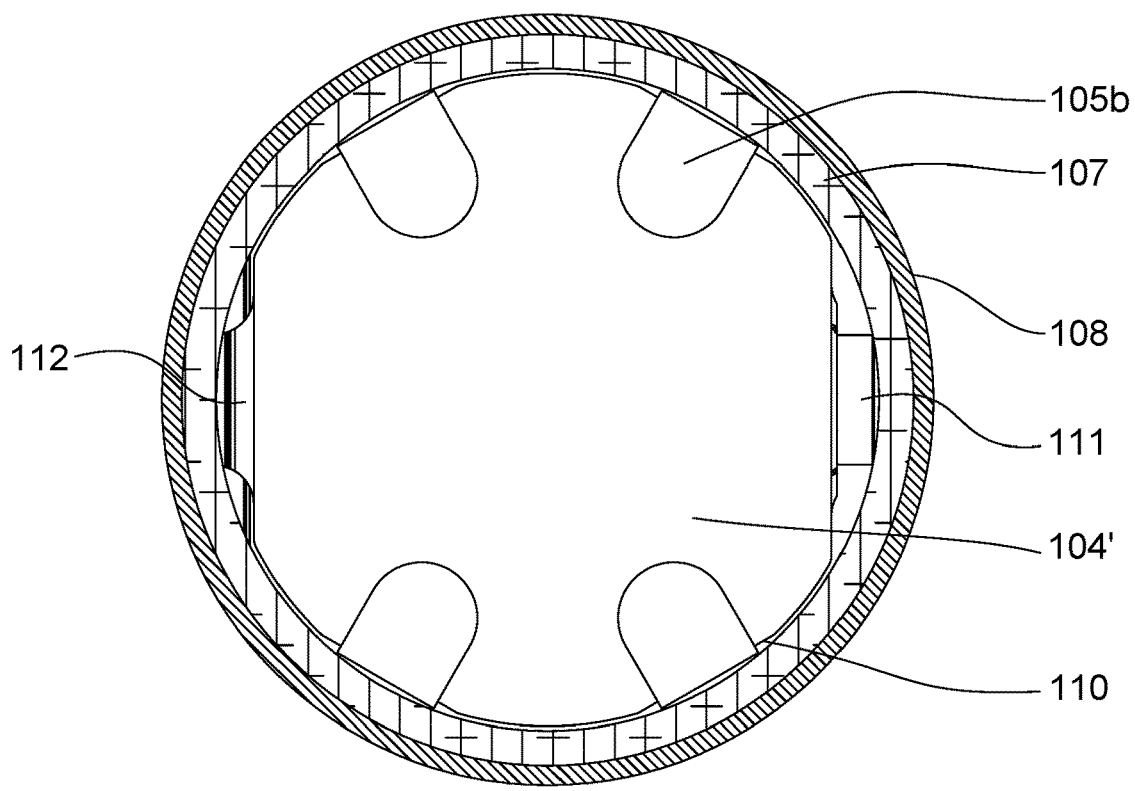
FIG. 6 is a cross section of a plan view of the coin cell of FIG. 1 viewed from the top.

Referring to FIGS. 1 to 7, a lithium coin cell 100 comprises a case 119 consisting of two metallic sides, more specifically a lid 101 corresponding to the negative electrode case, and a cup 108, corresponding to the positive electrode case. When the lid 101 and the cup 108 have been assembled, they form between each other a housing 117, inside which an assembly of stacked electrodes 113 is placed (FIG. 6). A gasket 107 is sandwiched between the lid 101 and the cup 108, the lid 101 having been pressed into said gasket 107.

Figure 7:
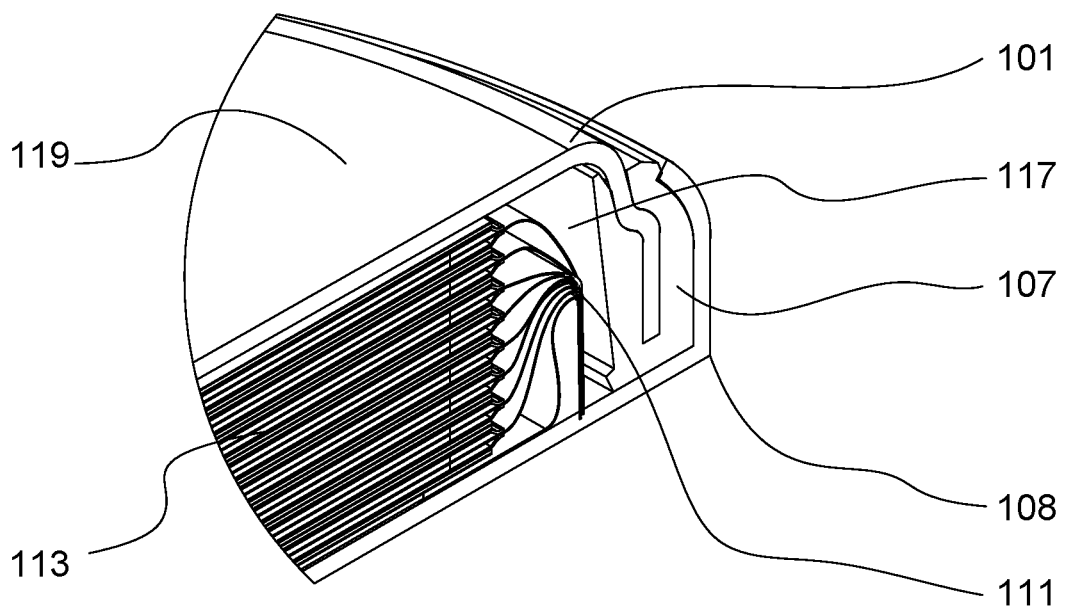
FIG. 7 is a cross section of the coin cell of FIG. 1 showing the folded positive welding joint.

The assembly 113 is made of several units 120 each comprising a negative electrode 104 (anode), electrolyte (not shown), a positive electrode 103 (cathode) and a separator 102 between the negative and positive electrodes 104,103. Each negative electrode 104 comprises an anode tab 115 which is designed to lead contact to the lid 101. Each positive electrode 103 has a cathode tab 114 which is designed to lead contact to the cup 108. In an embodiment, all the anode tabs 115 are welded together to form a negative welding joint 112 which electrically connects the negative electrodes 104 to the lid 101 via a first negative electrode 104' and all the cathode tabs 114 are welded together to form a positive welding joint 111 which electrically connects the positive electrodes 103 to the cup 108 via an additional positive contact tab 106, as explained below. In an embodiment of the present invention, as shown in FIG. 7, the positive welding joint 111 is folded substantially vertically towards the positive side 108 of the case 119 and the negative welding joint 112 is folded substantially vertically towards the negative side 101 of the case 119 (not shown). In this way, it is possible to avoid accidental contact of the welding joints 111 and 112 to the wrong poles of the cell 100 during assembly and use, thus preventing the risk of short circuit. Furthermore, the cross section in FIG. 7 clearly shows that the folding of the welding joints 111 and 112 enables to expand the assembly 113 closely to the gasket 107 thus increasing the energy density of the cell 100.

In one embodiment, as shown for example in FIG. 6, the positive and negative welding joints 111,112 are positioned on opposite sides of the assembly 113. Alternatively, the positive and negative welding joints 111,112 can be positioned in any other configuration around the edge of the assembly 113.

Lithium metal or lithium contained alloy, graphite-like materials, metal oxide, sulphide, nitride etc. that have low reduction potential can be used as active anode materials. Generally, lithium salt dissolving in no aqueous system is used as electrolyte, gel-like electrolyte is applied in lithium polymer battery and solid electrolyte can be used in solid-state lithium battery. Cathodes are the compounds that can take the lithium ions into the structure along with electrochemical reaction and meanwhile produce energy. Compounds such as sulphur, metal oxide, sulphide, phosphate, silicate etc. can be used as cathode active materials.

The staked electrode construction is applied in lithium battery with high power performance. To achieve this goal, cathode and anode materials are coated on metallic foil or mesh, and then stacked together alternatively with the separator 102 placed in-between them. The materials of the separator 102 can be chosen among the polymers with porous structure, such as polyethylene (PE), polypropylene (PP), polyvinylidene fluorides (PVDF), polyethylene terephthalates (PET) or mixtures thereof. Electrolyte is filled into the stacked electrodes.

The electrodes 103 and 104 of the assembly 113 are substantially disc-shaped. The positive electrodes 103 are enclosed in bag-like separators 102 and the electrodes 103 and 104 are alternately stacked one upon the other in order to form the substantially cylindrical stack 113 having a certain height or thickness. The assembly 113 comprises a negative electrode 104 at both of end surfaces, a first negative electrode, also numbered 104', being adjacent to the lid 101 and a last negative electrode, also numbered 104", being placed at the other end of the stack. The negative electrodes 104, 104' and 104" are both side coated electrodes. In another embodiment, the negative electrodes 104' and 104" are single side coated, wherein the blank metallic sides face the lid 101 and optionally a tape 105, respectively. In another embodiment, the blank metallic side of the negative electrodes 104' and 104" may comprise a conductive coating with carbon, structured as amorphous, crystalline, or graphene.

In one embodiment, the negative electrodes 104 have a total disc surface which is larger than the positive electrodes 103 and each negative electrode 104 comprises four notches 110 symmetrically positioned around its edge. The notches 110 of each negative electrode 104 are vertically aligned along the height of the assembly 113 so to design a substantially flat contact surface 116, as shown in FIGS. 2 to 6. The notches 110 may have different shapes depending on which means are used for holding together the assembly 113, as will be shown below. In one embodiment, the notches 110 have a substantially squared shape so to design a squared contact surface 116.

As shown in the Figures, the coin cell 100 may further comprise an insulating packing tape 105 comprising an insulator basis 105a and, in this shown embodiment, four holding means, in form of packing flaps 105b, extending symmetrically from either side of the insulator basis 105a. The packing flaps 105b are designed in such a way to fit to the flat contact surface 116 formed by the notches 110 on the edge of the negative electrodes 104. In other embodiments, the packing flaps 105b may comprise any other appropriate number of packing flaps wherein the corresponding flat contact surfaces 116 will be arranged accordingly. In another embodiment, as shown in FIG. 5, the holding means may be in form of an adhesive tape 118b, adhesive glue (not shown), clamps 118a, 118c, 118d. The shape of such alternative holding means is designed to fit the flat contact surface 116 of the assembly 113. The holding means (105b,118a,118b, 118c,118d) comprises rubber-based material, acrylic-based material, silicone-based material or combinations thereof.

The insulating packing tape 105 should be placed in such a way that the insulator basis 105a is between the assembly of stacked electrodes and one of the cases to avoid electrical contact between the assembly of stacked electrodes and said case and the packing flaps 105b hold the assembly 113 of stacked electrodes to form a compact electrode pack. More particularly, the insulating packing tape 105 is placed in such a way that the insulator basis 105a is between the last negative electrode 104" and the cup 108 in order to avoid the electrical contact between said last negative electrode 104" and the cup 108.

Figure 1:
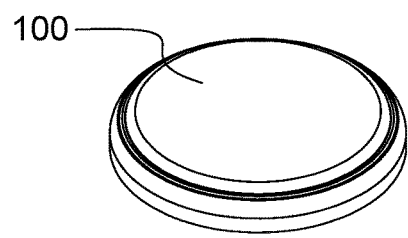
FIG. 1 illustrates a perspective view of a lithium coin cell of the present invention.
Figure 2:
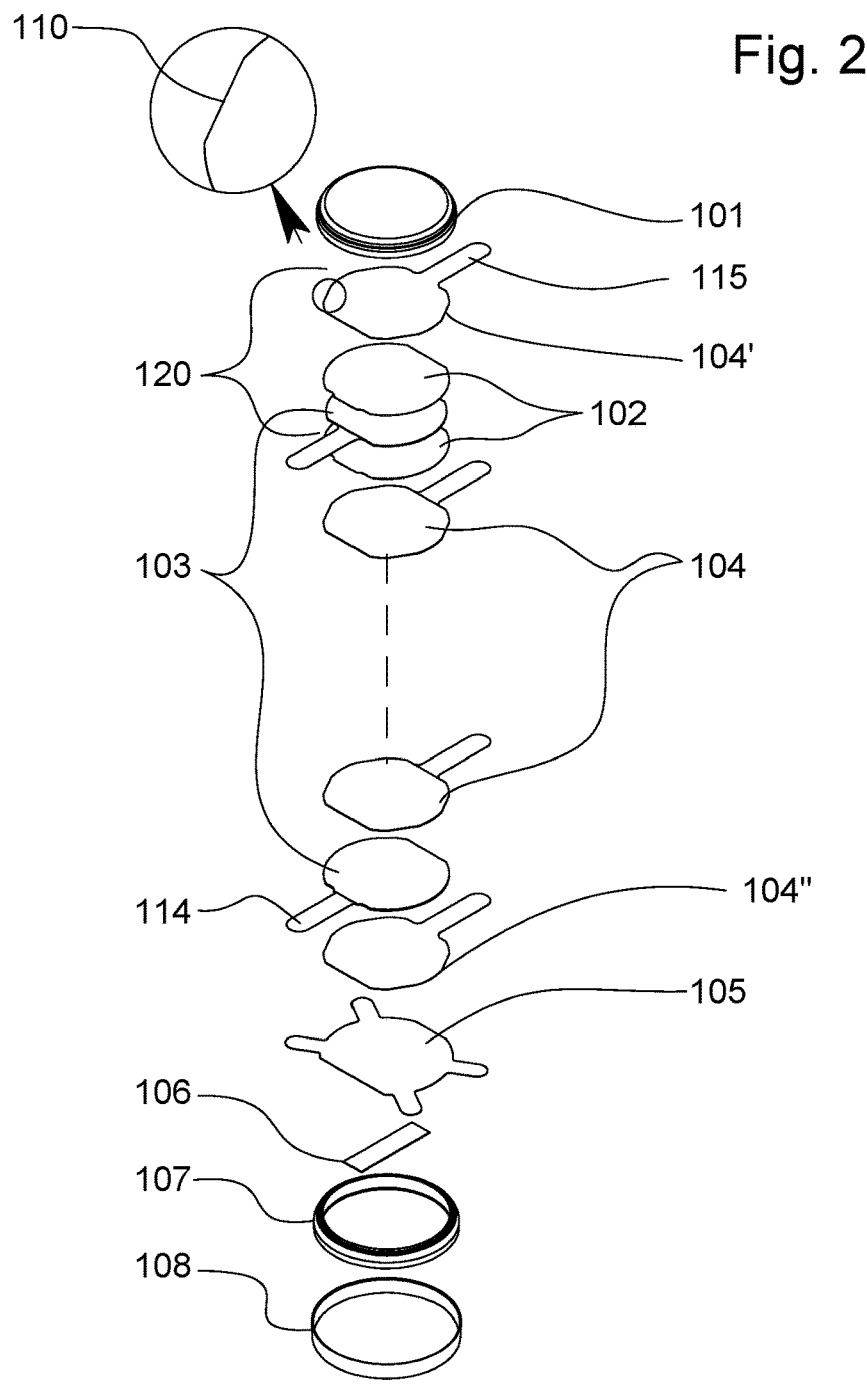
FIG. 2 illustrates schematically an exploded view of the lithium coin cell of FIG. 1.
Figure 3:
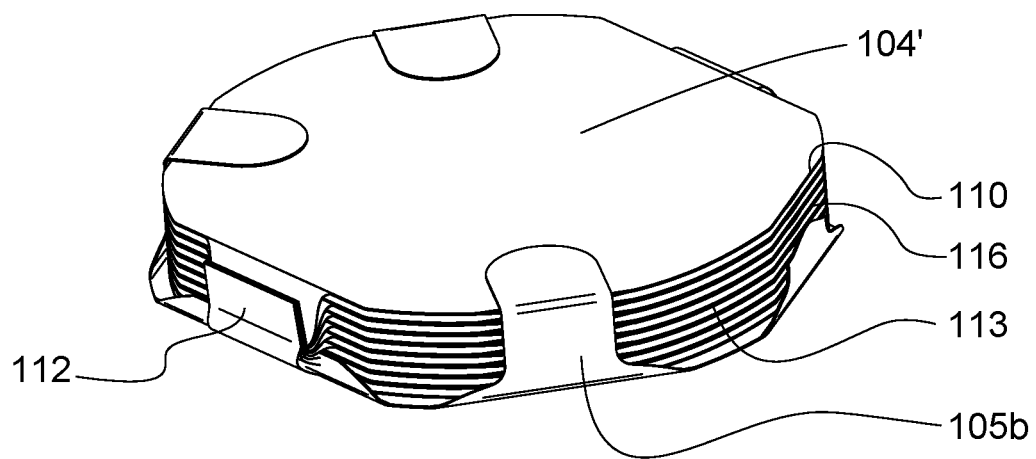
FIG. 3 is a perspective view from the negative welding joint of an assembly of stacked electrodes of the coin cell of FIG. 1.

The packing flaps 105b are folded along the height or the thickness of the assembly of stacked electrodes and folded back against the first negative electrode 104' to hold and pack said assembly 113 of stacked electrodes tightly, as shown in FIGS. 3, 4 and 6.

In this embodiment, the insulator basis 105a and the packing flaps 105b form one piece. In another embodiment, the packing flaps 105b may be manufactured separately and then being made integral with or attached to the insulator basis 105a by any suitable means known to one skilled in the art.

The insulator basis 105a and the packing flaps 105b comprise a substrate made of a material selected from the group comprising polyesters, polyolefins, polyimides, fluoropolymers, vinyl polymers, and an adhesive layer facing the assembly of stacked electrodes. Said adhesive layer is made of a material selected from the group comprising rubber-based material, acrylic-based material and silicone-based material. In other embodiments, the adhesive layer may be provided only on the packing flaps 205b on its side facing the assembly of stacked electrodes.

In a preferred embodiment, the insulating packing tape 105 is made of Kapton® which comprises a polyimide substrate and an acrylate adhesive layer.

The shape of the insulating packing tape 105 can be designed according to the form of the positive and negative electrodes. Preferably, the insulator basis 105a has a larger area than the facing last negative electrode 104" of the assembly of stacked electrodes, in order to minimize a short circuit risk from contacting the last negative electrode 104" and cup 108.

The coin cell 100 further comprises an additional metallic positive contact tab 106 placed between the insulating packing tape 105 and the cup 108, said additional positive contact tab 106 being arranged to lead contact between the positive electrodes 103 to said cup 108. Said additional positive contact tab 106 is arranged to be welded with the positive contact tabs 114.

The coin cell 100 of the invention is assembled by a method comprising the steps of:
a) stacking together alternatively the positive electrodes 103 and the negative electrodes 104, by placing a separator 102 in-between them to form an assembly of stacked electrodes;
b) holding the assembly of stacked electrodes obtained under a) with holding means 105b,118a,118b,118c and/or 118d;
c) packing the assembly of stacked electrodes obtained under b) with said insulating packing tape 105;
d) welding the anode tabs 114 together to form the negative welding point 112, and the cathode tabs 115 with the additional positive contact tab 106 together to form a positive welding point 111;
e) optionally folding the welding joint 111 substantially vertically toward the positive side 108 of the case 119 and the negative welding joint 112 substantially vertically towards the negative side 101 of the case 119.
f) filling assembly of stacked electrodes obtained under c) or d) with electrolyte;
g) placing the assembly of stacked electrodes obtained under e) into the lid 101 and the cup 108.
h) assembling the lid 101 and the cup 108 by pressing the lid 101 into the gasket 107 to close the coin cell 100.

The sequence of the steps f) and g) of filling the obtained assembly can be operated in either order.

Figure 8:
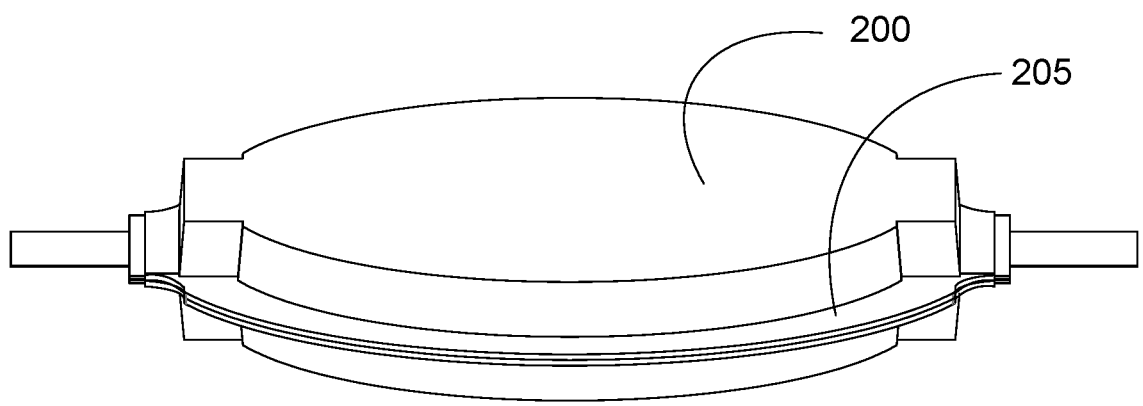
FIG. 8 is a perspective view of a pouch cell of the invention.
Figure 9:
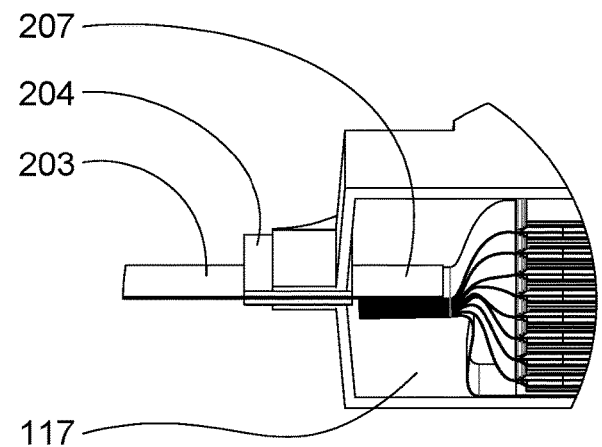
FIG. 9 is a longitudinal cross section of the pouch cell of FIG. 8 showing the assembly of stacked electrodes.
Figure 9:
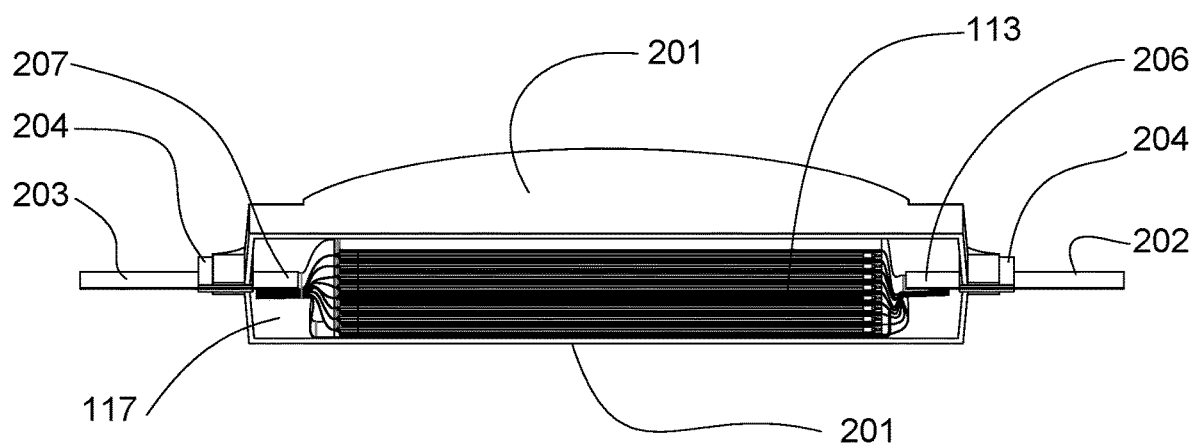
Figure 9:
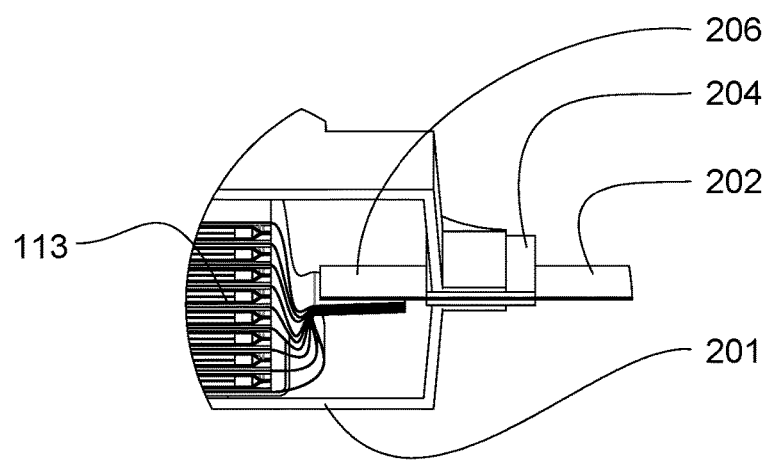

Referring to FIGS. 8 and 9, a further embodiment of the present invention is described. A cell 200 comprises a case consisting of two parts of non-conductive pouch foil 201, defining a housing 117, which parts are sealed together by means of the sealing portion 205. The housing 117 hosts an electrode assembly 113 as described above. The cathode and anode tabs of the electron assembly 113 are welded together to form a welding of anode tabs 206 and a welding of cathode tabs 207, respectively. The welding of anode tabs 206 and the welding of cathode tabs 207 are connected to a negative terminal tab 202 and a positive terminal tab 203, respectively, by means of a melt seal 204 allowing conductivity through the pouch foil 201.

The pouch foil can be a sandwiched structure, wherein both outer layers are polymers and the middle layer is an aluminum foil. The pouch foil can also be a polymeric single or multi-layer structure made, for example, of polyesters, polyolefins, polyimides, fluoropolymers, vinyl polymers, styrol polymers, polyamide (nylon), polyacrylonitrile, poly lactic acid, polystyrene, polyurethane, poly vinyl chloride or mixtures thereof.

The invention claimed is:

1. A cell comprising:
    a case designed to form a housing;
    an assembly of stacked electrodes placed inside the housing and including one or more units each having a positive electrode, a negative electrode, a separator between the positive and negative electrodes and an electrolyte, wherein the positive electrodes of the one or more units are electrically connected together to form a positive terminal and the negative electrode of the one or more units are electrically connected together to form a negative terminal; and
    one or more clamps having a flat side surface and only one of a top surface and a bottom surface for holding together the assembly,
    wherein at least each negative electrode of the one or more units comprises one or more notches, vertically aligned along the height of the assembly so to provide a substantially flat contact surface, said notches being arranged at a distance from the positive terminal and from the negative terminal,
    wherein the only one of a top surface and a bottom surface projects along a top surface of the assembly or a bottom surface of the assembly respectively, and
    wherein each of the one or more clamps is in contact with a respective one of the one or more notches such that the flat side surface of each of the one or more clamps extends along the flat contact surface of the respective one of the one or more notches.

2. The cell according to claim 1, wherein the case is made of metal and comprises a positive side of the metal case, a negative side of the metal case and a gasket.

3. The cell according to claim 2, wherein each positive electrode comprises a cathode tab and each negative electrode comprises an anode tab, the cathode tabs being welded together to form a positive welding joint and the anode tabs being welded together to form a negative welding joint, the positive welding joint being folded substantially vertically towards the positive side of the case and the negative welding joint being folded substantially vertically towards the negative side of the case.

4. The cell according to claim 1, wherein the clamps are comprise of rubber-based material, acrylic-based material, silicone-based material or combinations thereof.

5. The cell according to claim 1, further comprising a packing tape comprising a basis placed between the assembly and the case.

6. The cell according to claim 5, wherein the packing tape is an insulating packing tape to avoid electrical contact between the assembly and the case.

7. The cell according to claim 6, wherein each negative electrode has a larger surface than each positive electrode of the one or more units and only each negative electrode of the one or more units comprises the at least one notch.

8. The cell according to claim 5, wherein at least one packing flap which is integral with the basis.

9. The cell according to claim 8, wherein the basis and the packing flap each comprise a substrate made of polyesters, polyolefins, polyimides, fluoropolymers, vinyl polymers, styrol polymers, glass fiber-based substrates, cellulose based material, derivatives thereof or combinations thereof.

10. The cell according to claim 8, wherein the at least one packing flap comprises an adhesive layer facing the assembly.

11. The cell according to claim 8, wherein the basis and the packing flap are a single piece.

12. The cell according to claim 8, wherein the packing tape comprises at least two packing flaps extending, preferably symmetrically, from either side of the insulator basis.

13. The cell according to claim 8, further comprising a contact tab placed between the packing tape and a positive side of the metal case which is adjacent to said insulating packing tape, said contact tab being arranged to lead contact between the positive electrode of the one or more units and the positive side of the metal case.

14. The cell according to claim 1, which is a coin cell.

15. An assembly of stacked electrodes comprising:
    one or more units each including a positive electrode, a negative electrode and a separator between the positive and negative electrodes; and
    one or more clamps having a flat side surface and only one of a top surface and a bottom surface for holding the assembly together,
    wherein at least each negative electrode of the one or more units comprises one or more notches, vertically aligned along the height of the assembly so to provide a substantially flat contact surface,
    wherein the only one of a top surface and a bottom surface projects along a top surface of the assembly or a bottom surface of the assembly respectively, and
    wherein each of the one or more clamps is in contact with a respective one of the one or more notches such that the flat side surface of each of the one or more clamps extends along the flat contact surface of the respective one of the one or more notches.

* * * * *